(12) United States Patent
Gerfers, III

(10) Patent No.: US 7,090,380 B2
(45) Date of Patent: Aug. 15, 2006

(54) TRANSLUCENT WOOD VENEER LIGHTING SYSTEM

(76) Inventor: C. Arthur Gerfers, III, P.O. Box 793, Point Reyes Station, CA (US) 94547

( * ) Notice: Subject to any disclaimer, the term of this patent is extended or adjusted under 35 U.S.C. 154(b) by 0 days.

(21) Appl. No.: 10/898,597

(22) Filed: Jul. 22, 2004

(65) Prior Publication Data

US 2005/0018433 A1 Jan. 27, 2005

Related U.S. Application Data

(60) Provisional application No. 60/489,969, filed on Jul. 23, 2003.

(51) Int. Cl.
*F21V 1/12* (2006.01)
*F21V 11/00* (2006.01)

(52) U.S. Cl. ............... 362/360; 362/355; 362/367

(58) Field of Classification Search ............... 362/311, 362/351, 355, 360, 361, 367, 352
See application file for complete search history.

(56) References Cited

U.S. PATENT DOCUMENTS

| | | | | |
|---|---|---|---|---|
| 1,992,882 A | * | 2/1935 | Ovenhausen | 362/355 |
| 4,025,663 A | * | 5/1977 | Brandt | 362/311 |
| 6,547,419 B1 | * | 4/2003 | Brackman | 362/367 |

* cited by examiner

*Primary Examiner*—Stephen F Husar
(74) *Attorney, Agent, or Firm*—Paul K. Tomita; Dergosits & Noah LLP

(57) ABSTRACT

An ambient light is produced by transmitting light from a light source through an optical diffusion layer and then through a wood veneer. The optical diffusion layer obscures the light source and distributes the light transmitted through the wood veneer. The light then filters through the wood veneer via the color and grain of the wood. The light emitted from the wood veneer has natural colors that produce a warm ambient light.

20 Claims, 3 Drawing Sheets

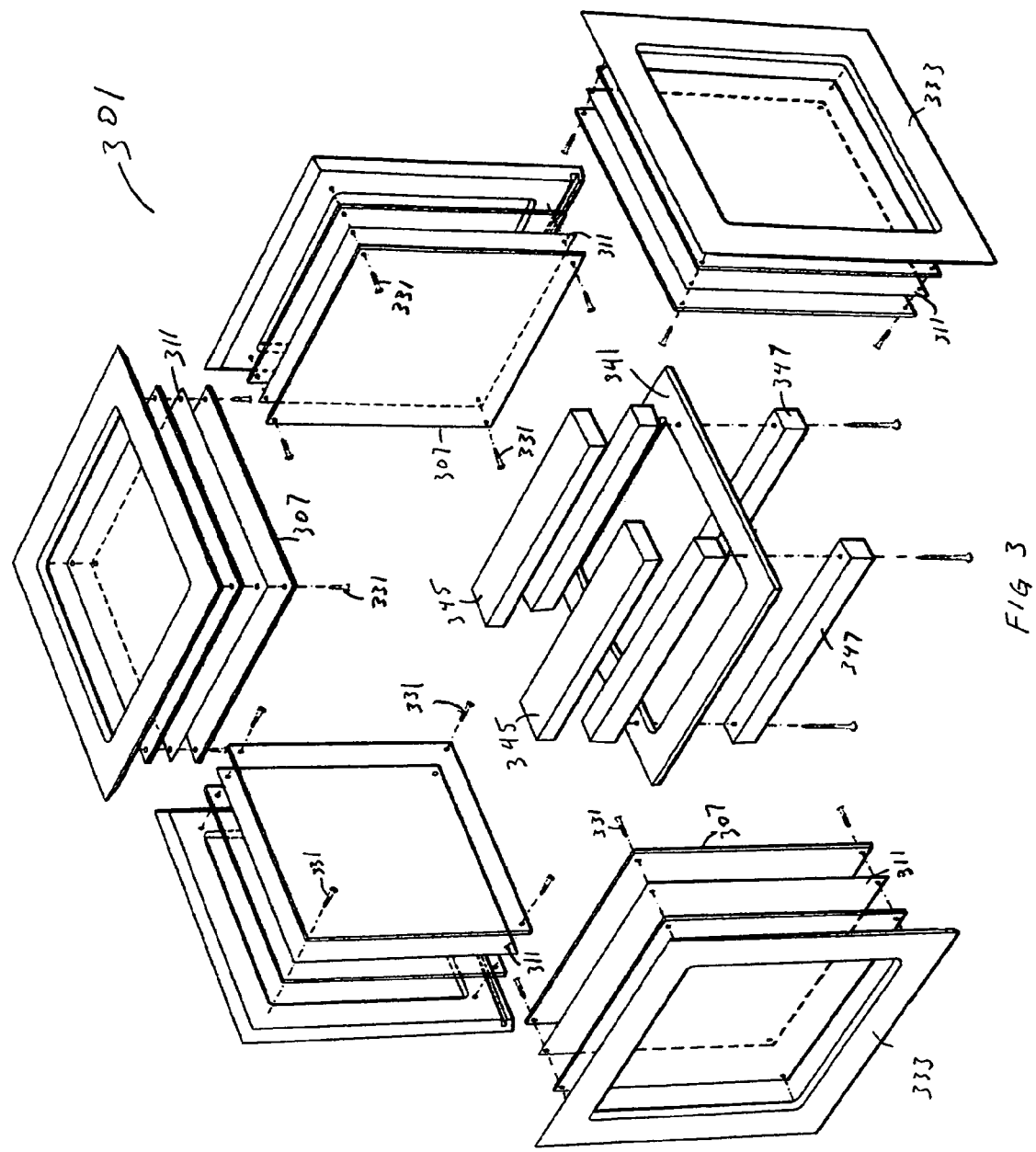

TRANSLUCENT WOOD VENEER LIGHTING SYSTEM

This patent application claims priority to U.S. Patent Application Ser. No. 60/489,969 filed Jul. 23, 2003, Translucent Wood Veneer Lighting System, which is hereby incorporated by reference.

BACKGROUND

Various lighting systems have been developed for room lighting that include a light source and a lamp shade made of a translucent layer which transmits some of the light from the light source. The lamp shade reduces the intensity of light emitted by the light source so that people can look at the light without discomfort to the eyes. Although lamp shades filter the light, they do not conceal the source of the light.

SUMMARY OF THE INVENTION

The present invention is directed towards a system for illuminating a wood veneer which produces ambient lighting. This ambient lighting is different than room lighting in that it is not intended to provide light for activities such as reading, but rather provide the room with a controlled ambient tone. In particular, the wood veneer used with the present invention typically has blond, brown and red colors that add warmth to a room when illuminated.

This wood veneer illumination system uses a light source, a diffusion layer and a wood veneer layer and an optional protective layer. The diffusion layer is placed between the light source and wood veneer layer in close proximity to the wood veneer layer. Light emitted from the light source is transmitted through the diffusion layer where it is refracted through various random angles to diffuse the light. Much of the light is then transmitted through the opposite side of the diffusion layer to the wood veneer layer. The wood veneer layer is thin enough to be translucent so that some of the light is filtered and some light is transmitted through the grain of the wood. Because the wood veneer may be very thin and flexible, this layer may be bonded to the translucent layer for structural support.

In another embodiment, the wood veneer is placed between a translucent layer and a clear layer. This sandwiching of the wood veneer provides structural support without the need for adhesives or bonding. Each of these layers may be cut to complementary sizes and held together typically along the perimeter of the layers.

The veneer, translucent and transparent layers may be placed together in a sandwiched configuration and then placed into grooves formed in thicker pieces. These grooved pieces may be mounted on one of more edges of the stacked layers to hold the wood veneer to the translucent layer or between the translucent layer and the transparent layer. Alternatively, the stacked layers can be attached to other stacked layers to form three dimensional objects. These illuminated wood veneer assemblies can be fabricated into various objects including: panels, lamps, furniture, cabinets and other three dimensional structures.

The light transmitted through the wood veneer illuminates the color and grain of the wood. In an embodiment, the color of the wood veneer layer can be altered by staining or painting the wood but should not make the wood veneer opaque such that the light is blocked. This alteration of the color of the wood results in a different color of light transmitted through the wood veneer.

BRIEF DESCRIPTION OF THE DRAWINGS

The invention is herein described, by way of example only, with reference to embodiments of the present invention illustrated in the accompanying drawings, wherein:

FIG. 3 is a second structure using the translucent layer and the wood veneer layer.

DETAILED DESCRIPTION

The present invention is directed towards a system for illuminating wood veneer panels in such a way that a uniform glow is produced. In order to evenly distribute the light through the wood veneer, the light is diffused before contacting the wood veneer layer.

Figure 1:
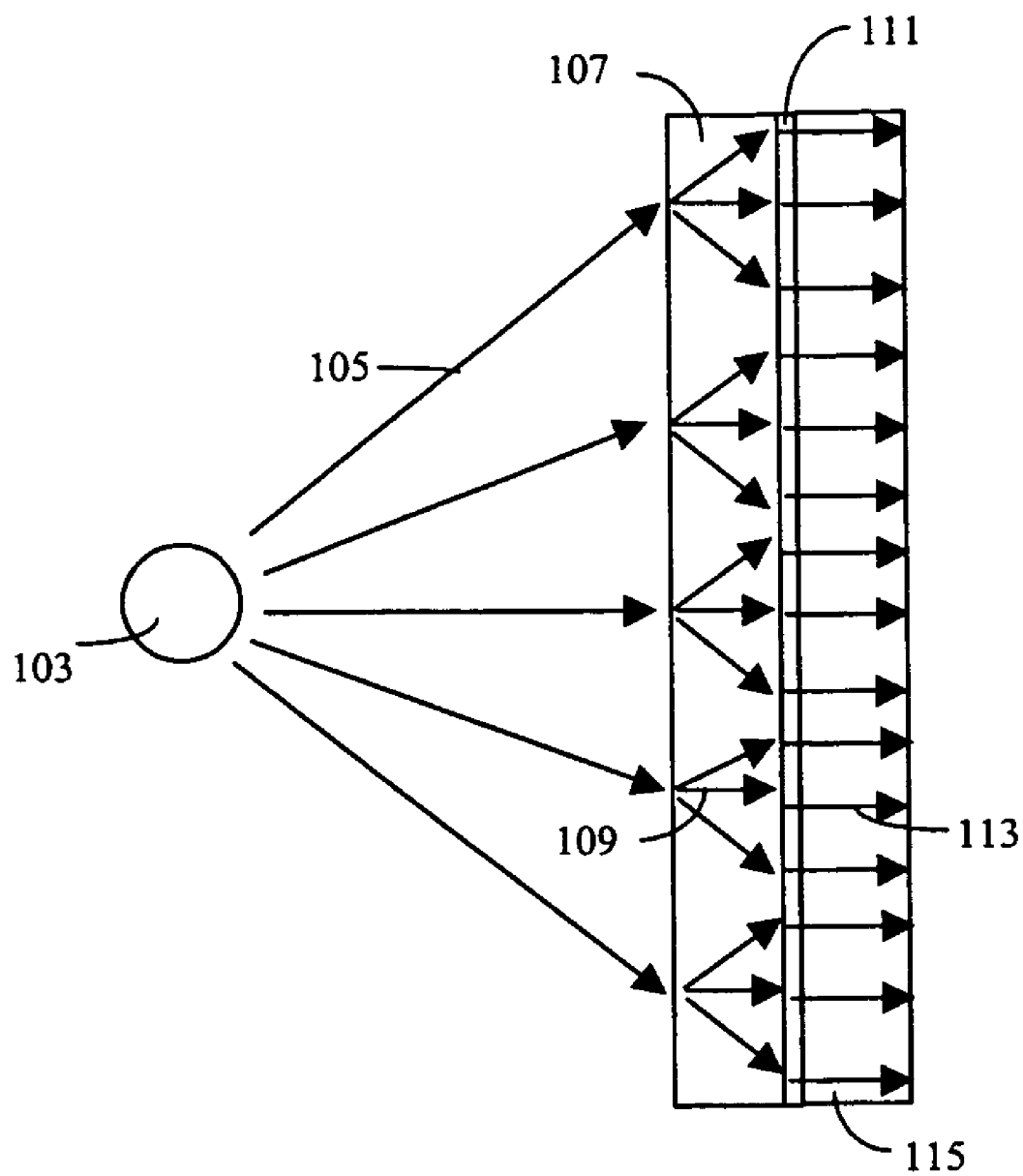
FIG. 1 is a diagram of the path of light beams in the present invention.

With reference to FIG. 1, there are various methods for obtaining diffused light. The light source 103 itself may be a light bulb having a frosted coating on the bulb glass to diffuse the emitted light 105. To further obscure the light source, the light 105 is transmitted through a planar diffusion layer 107. Normally, the exposed planar surfaces of the diffusion layer 107 are textured so that the light rays are bent at the points of incidence and scattered by refraction in a random pattern 109 within the diffusion layer. The light may be further diffused as it exits the diffusion layer 107 through a second textured surface. This scattering results in a diffusion of light so that the light source 103 is obscured before the light is transmitted through wood veneer 111 producing a uniform glow of light 113. The wood veneer 111 functions as a filter, which blocks specific types of light. In an embodiment, a transparent layer 115 may be placed in contact with the outer surface of the wood veneer 111. Although the transparent layer 115 has refractive optical properties, the surfaces are planar and there is no distortion or diffusion of the light transmitted through the transparent layer 115.

The diffusion layer scatters the incident light by refracting the light through one or more textured surfaces. The textured surface may have very small surface structures and have a "frosted" physical appearance. The textured surface can be obtained by etching the surface with a sand blaster, chemical etcher, mechanical etching, applying a textured surface, thermal processing, molding or any other process by which a frosted texture is applied. Without this surface texturing, the light would be transmitted directly through the transparent layer and the light source would be visible. A suitable translucent material is "light box" plastic. Other translucent plastic materials, such as acrylite, include pigments to diffuse the light.

Another means of diffusing the light emitted from the light source is with a material that inherently diffuses light. These materials are made of resins that offer unusually high luminous transmission coupled with excellent light hiding power. An example of this type of material is Plexiglas Frosted acrylic resin. The diffusion mechanism of tiny beads exists throughout the structure and on all surfaces. The tiny beads within the plastic scatter the incoming light, but mostly in the forward direction. This forward scattering of the light maximizes the optical efficiency, thus more light is transmitted through the translucent layer than a layer that has textured surfaces.

The Plexiglas Frosted acrylic resin provides about 84% light transmission. Yet the scattering mechanism raises haze values to 95% or more, effectively hiding the light source. Thus, lighting systems using this product get substantially more light with less power, greatly improving energy efficiency. This material is also cost effective because secondary surface processing such as sand blasting to realize diffusion is not required. Light transmitted through this material exhibits a pleasing, low-gloss, matte surface texture on both sides. Since the scattering mechanism is integral to the structure, surface scratches and further thermoforming have no noticeable effect on optical properties.

It is well known in the optical art that each visible color corresponds to a specific wavelength of light. Thicker, darker or denser sections of the wood veneer will block more light while thinner, lighter and less dense sections will allow more light to be transmitted. These variations throughout the wood veneer are unique to each piece and produce an optical pattern. Different types of wood will produce different optical outputs. For example, a lighter wood such as pine will produce a more yellow light while walnut will produce a darker brown light. The tree body from which the wood was taken is typically cylindrical in shape. As the tree grows it produces dark layers each summer. Thus, the cross section of the tree will have many concentric rings each representing a year of the tree's life. When the tree is cut into lumber and veneer sheets, these rings become lines of the wood grain which are darker than the rest of the wood. The dark lines in the grain of the wood veneer will block more light and will produce variations in the transmitted light. These variations in the wood veneer produce an optical output that has a pattern of lines and colors.

It is well known that the wood veneer can be fragile. In certain installations, it may be desirable to protect the wood veneer rather than leaving it exposed to potential damage. In order to protect the wood veneer, a transparent protective material may be placed over the wood veneer. In this embodiment, the illuminated sections are constructed as a "sandwich" of translucent material, wood veneer and transparent material. The light is mounted on the translucent material side to disperse the light transmitted to the wood. The transparent layer allows the natural appearance of the wood to be protected without diminishing its appearance.

The illuminated wood veneer is intended to be used in structures which have internal light sources. In an embodiment, the wood veneer panels are mounted on the exposed surfaces of these structures. For example, the illuminated wood veneer may be part of an enclosure having side surfaces, a top and an internal light source. A low wattage or cool operating fluorescent bulb is placed within the structure. When the bulb is illuminated, some of the light is transmitted through the wood veneer producing a glow in the color of the wood veneer and a pattern of the grain of the wood. This color and texture will vary depending upon the type of wood used in the veneer. The wood veneer is very thin in order to allow light to be transmitted and has very little structural strength. In order to provide sufficient structural strength and diffuse the incident light, the wood veneer is placed over a translucent optical diffusion layer. The process is used to make the wood panels and the structure as a whole appear to be of solid wood when the light is off, while providing a unique form of illumination when the light is on. In order to build upon this illusion, each of the veneer panels should be of a similar type and grain of wood. This inventive wood veneer illumination is for use in cabinetry, wall paneling, lamps and any other type of furniture.

The basic structure is a layer of wood veneer held against a pane of translucent material, preferably plastic or glass. In an embodiment, the veneer and translucent material are cut into complementary sizes. The veneer and translucent sheet are then placed into a frame having members which engage both the front of the veneer and the back of the translucent sheet to hold the veneer in position. Various other mechanisms can be used to hold the veneer and translucent components together. For example, the veneer may be bonded to the translucent sheet with an adhesive and then installed in a multitude of structures. This bonding may result in the wood veneer being laminated to the diffusion layer.

Figure 2:
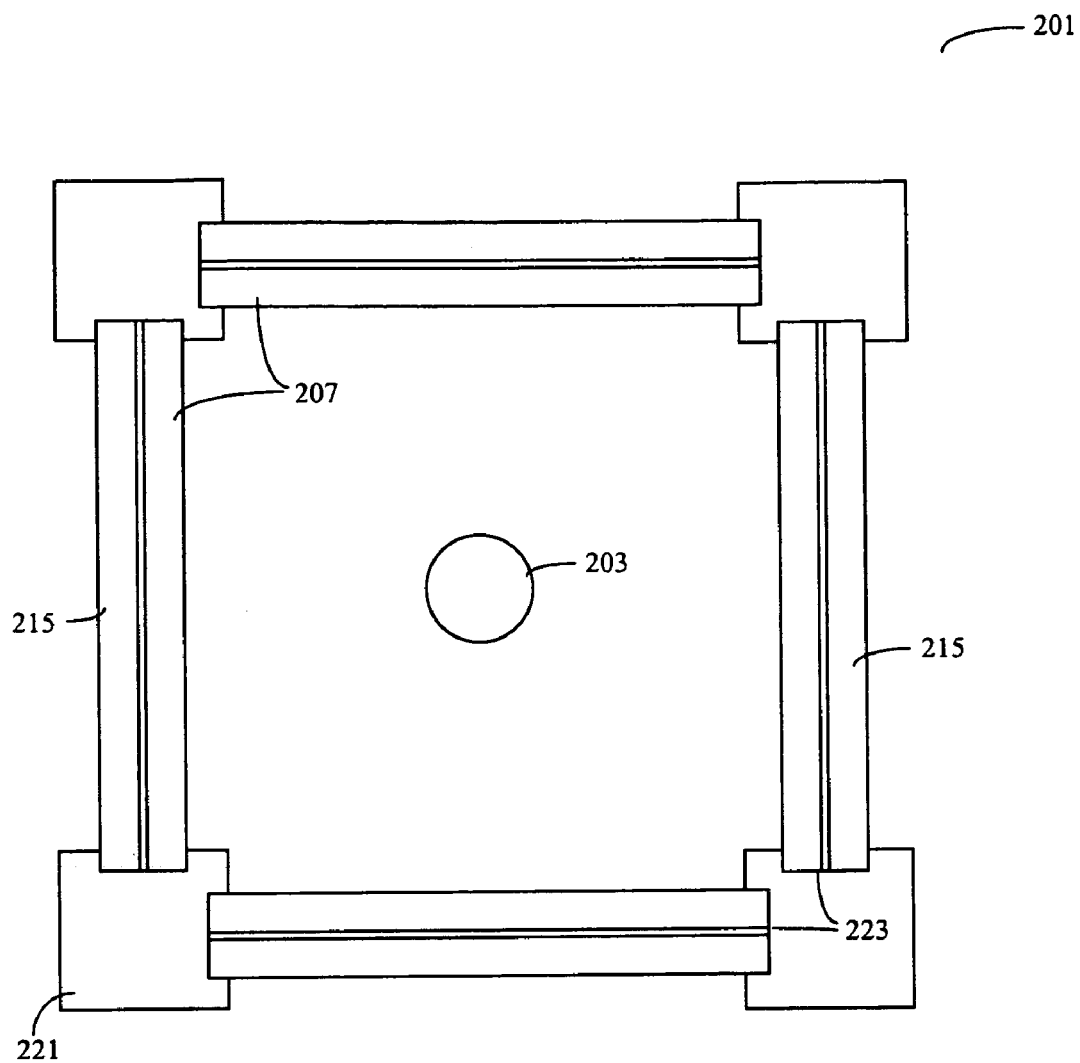
FIG. 2 is a first structure using the translucent layer and the wood veneer layer.

Alternatively, the edges of the veneer and translucent sheet can be placed in a groove which holds the components together. With reference to FIG. 2, a four walled cross section of an illuminated wood veneer structure 201 is illustrated. A light source 203 is mounted in a center region of the structure 201. Each of the corner pieces 221 have grooves 223 which are used to hold the diffusion layer 207 and wood veneer 211 together. In an embodiment, a transparent layer 215 is on the outside of the wood veneer 211 so that this three layer structure is placed into and held together by the groove 223. This three layer structure provides the same uniform illumination of the wood veneer 211 but is structurally improved because the transparent layer 215 is much stronger than the wood veneer 211.

Yet another embodiment of the present invention is illustrated in FIG. 3. In this illustration, an exploded view of a cube assembly 301 having illuminated wood veneer side panels is shown. Like the previously described illuminated wood veneer structures, each side of the assembly 301 may include a wood veneer layer 311 placed between an optical diffusion layer 307 and a transparent layer 315. Rather than placing these layers into a groove to hold the layers together, holes may be drilled in the corners or edges of the optical diffusion layer 307, the wood veneer layer 311 and the transparent layer 315 and screws 331 may be used to attach these planar pieces to the frame piece 333. Alternatively, the optical diffusion layer 307, the wood veneer layer 311 and the transparent layer 315 may be attached to the frame pieces 333 with clips, fasteners, adhesives or any other type of connector. The frame pieces 333 have cutout centers so that the wood veneer layers 311 are visible. The frame pieces 333 may be made of wood, plastic, metal or any other structural material which may be laminated with a veneer or treated to match the wood veneer layer 311.

After the optical diffusion layers 307, the wood veneer layers 311 and the transparent layers 315 are attached to the frame pieces 333, the frame pieces 333 are assembled into the cube assembly 301. The outer edges of the frame pieces 333 may be beveled so that when they are connected, the area of connection forms a clean corner. The cube assembly 301 also has a base 341, legs 247 and light tubes 345 mounted to the base 341. In this embodiment, the frame pieces 333 are mounted on four sides and the top of the cube assembly 301. When power is supplied to the light tubes 345, light is diffracted through the optical diffusion layer 307 to provide an even distribution of light through the wood veneer layer 311 and the transparent layer 315. Because the frame pieces 333 are much thicker and opaque, the internal light does not travel through the frame pieces 333. The base 341 may be open allowing light to be emitted from the bottom of the cube assembly 301 or it may alternatively be closed blocking all light.

Although a transparent material may be used between the light source and the wood laminate, a transparent layer will not produce a uniform glow. The light is transmitted directly through the transparent panel and will not diffuse as much. This results in a high concentration of light at the light source also known as a "hot spot." It is therefore preferable to use a translucent material which diffuses light in the lamp application so that each panel of the structure produces a uniform glow. A translucent panel diffuses the transmitted light and provides a more uniform illumination of the wood veneer.

A light source within the structure produces the light that is transmitted through the wood veneer. Because the wood is flammable, it is important to keep the laminate relatively cool. In an embodiment, the wood laminate structures are fully or partially enclosed which prevents cooling of the bulb and interior space by convection. The light used with these applications must not generate excessive heat. Low heat producing light sources such as but not limited to: fluorescent light bulbs or tubes, light emitting diodes, low wattage (<40 watts) incandescent bulbs may be used. High wattage incandescent light bulbs may not be suitable for these applications, as they require ventilation, through either the back or the top of the structure. However, higher wattage bulbs may be used in structures which are made of heat resistant materials.

Because the light sources have a limited life and must be periodically changed, a light bulb socket mounted within the structure may be used to facilitate the replacement of the light source. In a portable embodiment, the low heat producing light bulb may be placed in a standard light socket and electrical power can be connected to the socket through an electrical cord and a two-pronged electrical plug. In a nonportable or built-in embodiment, the socket(s) is directly connected to the existing power system within the building. Single bulbs, multiple bulbs or light tubes may all be used. The electrical power provided to the light source can be controlled with an on/off switch or dimmer.

Several examples of structures suitable for use with the illuminated wood veneer are described below:

LAMP—The inventive illuminated veneer may be used in a lamp which is in the form of a box. One or more sides of the box may be the wood veneer and translucent sheet and the edges of the box may be elongated rods having grooves cut along their lengths. The box structure may have solid walls or an opening, however the opened side should not be immediately visible to persons viewing the lamp. The lamp may be fabricated by first assembling the rods into a frame and then installing the panels into each side of the frame. The lamp may have various shapes or combination of shapes including but not limited to: a box, a cylinder and a sphere. The lamp may have a base or may be suspended from a bracket or hang from a support connected to another structure.

In order to enhance the illusion that the light is emanating from a solid object, the preferred embodiment of the lamp will use solid or translucent wood on all visible sides of the box. In particular, the top of the lamp should be covered to prevent people from being able to directly view the bulb or light source. Because only low heat producing lights are used, the closed top does not create a fire hazard where the interior surfaces can get too hot and burn. A version of this embodiment has been approved by Underwriters Laboratories, Inc.

Although the veneer panels have been illustrated as being planar is shape, it is also possible to produce curved surfaces. Because the veneer tends to be more flexible when bent across the grain, it is possible to have a curved translucent panel and place the veneer over this curved surface. As discussed, the veneer is flexible and can therefore be curved to take the shape of the underlying plastic or glass.

The inventive lamp is distinct from Japanese or Shoji lamps, which use translucent paper to cover the side panels or other lamp shades which use translucent paper. In these structures, there is no diffusion of the light before it is transmitted through the translucent paper. Thus, the light is diffused by the paper layer and the source of the light can be seen. Another distinction is that the Japanese lamps are intended to be used as useful light within a house and thus produce a substantial amount of visible light without any specific color filtration. The inventive illuminated wood veneer system is intended to be used as ambient lighting and may not be useful for certain applications. For example, reading using the illuminated wood veneer may be difficult because much of the light lacks the required intensity and much of the visible light colors are filtered making text on a page less legible. Yet another distinction is that the inventive translucent wood veneer light system has a diffusion layer between the light source and the wood veneer layer which diffuses the light before it gets to the wood veneer layer. The resulting light that is emitted from the inventive lighting system is more uniform and produces a more even glowing optical output.

The Japanese or Shoji-style lamps only have paper covers on the side panels and are open at the top and bottom. This configuration is necessary because high heat producing incandescent light bulbs are typically used and air circulation is necessary to keep the interior of the lamp cool. The paper coverings on the side panels are typically white and function like a lamp shade, so the lamp generates a non-colored light. In contrast, the inventive wood laminate lamp is a substantially closed structure which does not allow air to freely circulate. The light transmitted through the panels is the color of the wood and produces an illuminated pattern of the wood grain.

WALL PANELS—The illuminated veneer can also be used in a large wall paneling. In this embodiment, one or more illuminated panels may be placed on the wall of a room and large areas of veneer can be used to create larger illuminated planes. In order to enhance the illusion that the light is emanating from a solid wall, the preferred embodiment of the paneling will use solid or translucent wood on all exposed surfaces. As described in the lamp embodiment, the wood veneer is placed next to a plastic or glass plane and light source(s) are placed behind the translucent material. The wall panel has a shallow box structure. In order to evenly disburse the light across the larger laminate plane, multiple light bulbs or light sources may be used. Although wall panels are normally mounted on interior walls of buildings, they may also be mounted on the flooring or from the ceiling.

CABINETS—The cabinets are similar to the lamps in that they employ a combination of opaque and translucent wood. The cabinet has a box structure and may have doors, which open for storage. In an embodiment, the cabinet doors could be constructed of any combination of solid and translucent veneer panels framed in solid wood and illuminated by a light source mounted seamlessly within the ceiling or back wall of the cabinet interior. This embodiment allows for conventional access to the contents of the cabinets while providing the lighting effect of the translucent wood when the cabinet doors are closed. Additionally, the top surface or countertop of the cabinet may be an illuminated wood veneer surface. If the upper surface is protected by a transparent layer of material, objects may be placed on the upper surface and the glow of the illuminated wood may enhance the presentation of the displayed objects.

FURNITURE—The illuminated veneer may also be incorporated into any other type of furniture, which has space for a lighting system. For example, in a desk one or more of the side panels can be made of the translucent wood veneer and the illumination source can be placed within the desk structure.

While the present invention has been described in terms of a preferred embodiment above, those skilled in the art will readily appreciate that numerous modifications, substitutions and additions may be made to the disclosed embodiment without departing from the spirit and scope of the present invention. Those skilled in the art will readily appreciate that the inventive wood veneer illumination system may be utilized in any similar electronic device and that the present invention is in no way limited to mechanisms described above. It is intended that all such modifications, substitutions and additions fall within the scope of the present invention which is best defined by the claims below.

What is claimed is:

1. A light structure for providing ambient lighting comprising:
    an electrical socket;
    a light source which is connected to the electrical socket and emits visible light;
    a wood veneer layer; and
    a translucent layer mounted between the wood veneer layer and the light source which diffuses light from the light source and distributes the light evenly through the wood veneer layer; and
    a frame having a side panel; wherein an edge of the wood veneer layer and an edge of the translucent layer are attached to the side panel of the frame.

2. The light structure of claim 1 wherein the light source is an incandescent light, a fluorescent light or a low heat producing light.

3. The light structure of claim 1 further comprising:
    a transparent layer in physical contact with the wood veneer layer.

4. The light structure of claim 1 wherein a first side of the translucent layer has a plurality of exposed refractive surfaces that diffract the incident light in a random pattern.

5. The light structure of claim 4 further comprising:
    a transparent layer in physical contact with the wood veneer layer.

6. The light structure of claim 4 wherein a second side of the translucent layer has a plurality of exposed refractive surfaces that diffract the incident light in a random pattern.

7. The light structure of claim 6 further comprising:
    a transparent layer in physical contact with the wood veneer layer.

8. The light structure of claim 1 wherein the translucent layer has refractive optical components within the thickness of the layer.

9. The light structure of claim 8 further comprising:
    a transparent layer in physical contact with the wood veneer layer.

10. The light structure of claim 8 wherein the majority of the light incident upon a first side of the translucent layer is transmitted out through an opposite side of the translucent layer.

11. A light structure for providing ambient lighting comprising:
    a light source which emits visible light; and
    a panel having a solid plastic translucent layer, a wood veneer layer and a transparent layer;
    wherein the wood veneer layer is in physical contact with the translucent layer and the transparent layer, the translucent layer diffuses the visible light from the light source and the translucent layer is mounted between the light source and the wood veneer layer.

12. The light structure of claim 11 wherein the wood veneer is attached to the translucent layer with a transparent adhesive.

13. The light structure of claim 11 wherein the panel is attached to a frame.

14. The light structure of claim 11 wherein a first side of the translucent layer has a plurality of exposed refractive surfaces that diffract the incident light in a random pattern.

15. The light structure of claim 14 wherein the panel is attached to a frame.

16. The light structure of claim 14 wherein a second side of the translucent layer has a plurality of exposed refractive surfaces that diffract the incident light in a random pattern.

17. The light structure of claim 16 wherein the panel is attached to a frame.

18. The light structure of claim 11 wherein the translucent layer has refractive optical components within the thickness of the layer.

19. The light structure of claim 18 wherein the panel is attached to a frame.

20. The light structure of claim 18 wherein the majority of the light incident upon a first side of the translucent layer is transmitted out through an opposite side of the translucent layer.

* * * * *